United States Patent [19]
O'Rourke

[11] Patent Number: 5,329,881
[45] Date of Patent: Jul. 19, 1994

[54] DOG CHEW TOY FOR CANINE DENTAL CARE AND METHODS FOR MAKING CHEW TOY

[75] Inventor: Anthony O'Rourke, Malibu, Calif.

[73] Assignee: Booda Products, Inc., Gardena, Calif.

[21] Appl. No.: 938,282

[22] Filed: Aug. 31, 1992

[51] Int. Cl.5 .............................................. A01K 29/00
[52] U.S. Cl. ....................................... 119/710; 427/2; 427/2.29; 119/709
[58] Field of Search ............... 119/29, 29.5; 132/321; 433/1; 128/62 A; 424/52, 58, 442; 427/2

[56] References Cited

U.S. PATENT DOCUMENTS

| | | | |
|---|---|---|---|
| 1,149,170 | 8/1915 | Allis | 119/29.5 |
| 4,033,365 | 7/1977 | Klepak et al. | 132/321 |
| 4,034,771 | 7/1977 | Guyton | 132/321 |
| 4,414,990 | 11/1983 | Yost | 132/321 |
| 4,924,811 | 5/1990 | Axelrod | 433/1 X |
| 4,986,288 | 1/1991 | Kent et al. | 132/321 |
| 5,033,410 | 7/1991 | Siqurdsson | 119/29.5 |
| 5,092,272 | 3/1992 | O'Rourke | 119/29 |

Primary Examiner—Robert P. Swiatek
Attorney, Agent, or Firm—Lyon & Lyon

[57] ABSTRACT

A chew toy for dogs comprising a length of cotton rope formed of a plurality of cotton threads impregnated with fluoride particles so as to dispose the fluoride particles throughout the toy such that the cotton rope provides a gentle cleaning and flossing of the dog's teeth and massaging of the dog's gums when chewed and contains the fluoride for gradual release as the fluoride combines with the saliva on the teeth of the dog as the dog chews and/or tugs on the toy to prevent tooth decay. The fluoride particles are applied to the individual cotton fibers prior to forming the fibers into the length of rope to provide the desired fluoride distribution throughout the toy.

44 Claims, 2 Drawing Sheets

_fig. 2_

_fig. 6_

DOG CHEW TOY FOR CANINE DENTAL CARE AND METHODS FOR MAKING CHEW TOY

BACKGROUND OF THE INVENTION

The present invention relates to a novel chew toy for dogs for improving canine teeth care. In recent years, veterinarians have become increasingly aware of the need for improved canine dental care. Many veterinarians are recommending the regular brushing of a dog's teeth to prevent decay and gum disease. Such a practice, however, is distasteful to many pet owners and not generally enjoyed by dogs. As a result, such recommendations have been largely ignored and a dog's teeth are generally ignored by its owner until a problem arises.

A popular chew toy for dogs previously developed by applicant comprises a short length of cotton rope having large knots formed near the ends thereof so as to resemble a classic dog bone configuration. The soft cotton rope provides a cleaning and flossing of the dog's teeth and a gentle massaging of the dog's gums when chewed and thus provides therapeutic dental benefits as well as playful enjoyment for the dog. While providing an excellent means for cleaning the dog's teeth and promoting healthful gums, such devices do not provide a complete solution to the problem of canine tooth care. Just as fluoride is now universally recognized as a necessary element of human dental care, it would also be highly beneficial for canine dental care. Unfortunately, there does not currently exist an acceptable means for applying fluoride to a dog's teeth. Based on past experiences, brushing a dog's teeth with a cleaning agent containing fluoride would not present an acceptable method to pet owners. Regular fluoride applications by a veterinarian would be too expensive for most pet owners. The present invention overcomes these problems by providing a vehicle for the fluoride which requires no effort on the part of the dog owner, is inexpensive and highly attractive to dogs.

In addition to fluoride, a complete dental care program includes tartar and plaque control. A build-up of tartar or plaque between the teeth and gums can cause the gums to separate from the teeth and lead to tooth decay and gum disease. The chew toy of the present invention also provides a vehicle for agents known to inhibit the build-up of tartar and plaque on teeth and thereby provides dog owners with an inexpensive and very convenient means for maintaining their pets' teeth and gums in a healthy condition.

A somewhat related problem to tooth and gum care of which pet owners are acutely aware is canine halitosis. The chew toy of the present invention not only inhibits the growth of bacteria which cause the problem, but can also serve as an effective vehicle for a breath freshener.

SUMMARY OF THE INVENTION

Briefly, the present invention is directed to a therapeutic chew toy for dogs comprised of a length of cotton rope formed into a desired configuration and impregnated with fluoride and/or one or more other dental care or breath freshening agents. The soft cotton threads comprising the rope toy provide a cleaning and flossing of the dog's teeth and a gentle massaging of its gums when chewed or otherwise used by the dog as an interactive toy for playful tugging with humans. The fluoride and/or other therapeutic agents which are applied to and carried by the cotton thread interact with the dog's teeth and saliva to affect their intended purpose. By adhering the therapeutic agents to the individual cotton threads prior to twisting the threads into the rope configuration, the agents are dispersed uniformly throughout the formed chew toy and contained therein such that they can be continually released to the dog's teeth with repeated usage and not readily exhausted so as to prolong the useful therapeutic life of the toy.

In forming the chew toy of the invention, the fluoride and/or other agents can be applied to the cotton threads in a powder form, in an aqueous solution, or encapsulated in polymeric beads which will later release the fluoride under the friction of the dog's teeth. When the agents are applied in a powder form, the individual cotton threads which comprise the toy are directed from a plurality of spools through one or more guide members to a misting station where the threads are lightly sprayed with a water mist to expand the cotton fibers and open the pores therein. The moistened threads are then directed through a spray chamber. Within the chamber, the powdered fluoride and/or other agents are blown onto the individual threads and into the open pores therein. The threads pass from the spray chamber through a drying station where the threads are dried, closing the pores in the cotton fibers about the particulate agents such that the agents will adhere to the individual threads. The threads are then gathered and twisted in a conventional manner into skeins which are twisted together to form a length of rope with the particulate agents being held within the closed pores of the cotton fibers comprising the individual threads. The rope is then cut to size and formed into a desired toy configuration. In the preferred configuration of the toy, the rope is cut into relatively short lengths and knots are tied proximate the ends of the severed lengths so that the resultant toy resembles a classic dog bone configuration.

In an alternative process employing the application of powdered fluoride and/or other therapeutic agents to the individual cotton threads, the misting and drying stations are eliminated and the powdered agent or agents are sprayed onto the threads in a dry condition within the spray chamber. In this process, each of the individual threads are passed through one or more alignment guides which impart a static charge to the threads prior to the threads entering the spray chamber. The spray chamber is ionized to charge the particulate therapeutic agents therein so as to create an ionic bonding of the particles to the statically charged cotton threads. The threads are then formed into a desired rope chew toy configuration, as described above.

Through either of the above-described processes, the resultant saturation of the cotton rope with fluoride and/or other therapeutic agents provides an excellent vehicle for the agents to the dog's teeth and the gradual release thereof as the agents combine with the saliva on the teeth as the dog chews and/or tugs on the toy.

Fluoride also can be applied to the individual cotton threads in an aqueous solution comprising fluoride and polyvinyl alcohol wherein the fluoride comprises about six percent by weight of the solution and the alcohol about one half percent by weight. The solution can either be sprayed onto the individual threads in the spray chamber, or the threads can be passed through a bath of the solution. The threads are then passed through a drying station, gathered and twisted into a length of rope from which the toy is formed as above-described. Other therapeutic agents in addition to or in lieu of fluoride can be employed in such a solution and imparted to the threads in this manner.

In another embodiment of the invention, fluoride powder and/or other therapeutic agents are encapsulated in porous polymeric beads of the type disclosed in U.S. Pat. No. 4,690,825. The polymer beads encapsulate the fluoride and/or other agents and, upon friction with the dog's teeth, release the agents onto the teeth. The polymeric beads can be applied to the individual cotton threads either by spraying the beads onto the moistened cotton threads such that they are held within the pores of the cotton fibers upon drying, or the agent-carrying beads can be created with a strong negative ionic charge such that they will adhere to the cotton threads by ionic bonding.

It is therefore the principal object of the present invention to provide a chew toy for dogs for improving canine teeth care.

It is another object of the present invention to provide an improved means for regularly applying fluoride to a dog's teeth.

It is yet another object of the present invention to provide a chew toy for dogs impregnated with one or more selected therapeutic additives for canine tooth care.

It is a further object of the present invention to provide a chew toy for dogs which provides a gentle cleaning and flossing of the dog's teeth, a gentle message of its gums and which releases fluoride to the dog's teeth as the toy is chewed and/or tugged by the dog.

It is still a further object of the present invention to provide a means for impregnating a cotton chew toy with fluoride and/or one or more other therapeutic agents for canine tooth care.

It is yet another object of the present invention to provide a means for impregnating a cotton chew toy for dogs with a breath freshening agent and/or an attractive flavoring agent.

These and other objects and advantages of the present invention will become readily apparent from the following description taken in conjunction with the accompanying drawings.

DESCRIPTION OF THE PREFERRED EMBODIMENT IN THE DRAWINGS

Referring now in detail to the drawings, the dog chew toy 10 of the present invention is comprised of a length of rope 12 formed of three strands or skeins 13 of twisted cotton threads 14 uniformly impregnated with one or more particulate dental care agents 16, such as fluoride, and formed into a desired chew toy configuration. While fluoride is the preferred dental care agent carried by chew toy 10, the threads 14 of toy 10 can be impregnated with other therapeutic agents in lieu of or in addition to fluoride. Breath freshening and flavoring agents can also be used. The configuration of the toy 10 and the basic methods for applying the agent or agents to the threads thereof do not depend on the particular agent or agents being used. Accordingly, the following description of the chew toy and methods for producing the toy will generally refer solely to fluoride as the additive agent. It is to be understood, however, that the present invention is not limited to a single agent or type of agent, as will be more fully explained later herein.

Figure 1:
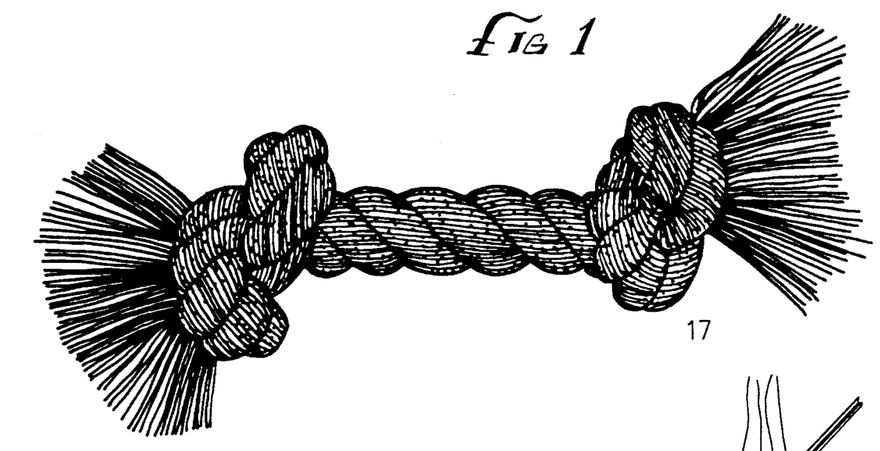
FIG. 1 is a perspective view of the dog chew toy of the present invention.

In the preferred configuration of chew toy 10 illustrated in FIG. 1, the cotton rope 12 is relative short in length and provided with large knots 17 tied proximate its extended ends so as to resemble a classic dog bone. While such a configuration has proved popular with dogs, a wide variety of different chew and tug toy configurations could be employed with the present invention. It is to be understood that while the threads of which rope 12 is formed are preferably one hundred percent natural cotton, threads comprised of a blend of cotton and other natural or synthetic fibers, such as polyester, could be used. If blended threads are employed, the threads should be at least seventy and more preferably ninety-five percent cotton. Unless otherwise stated, the term "cotton" as used herein is intended to include such cotton blends.

In the formation of toy 10, a conventional rope-forming process is preferably employed wherein the fluoride 16 is applied to the cotton threads 14 prior to twisting the threads into the skeins 13 from the which the rope 12 is formed so as to disperse the fluoride throughout the chew toy 10 and thereby better contain the fluoride. Such a distribution and containment of the fluoride provides for a gradual release thereof as the fluoride combines with the saliva on the teeth of the dog and thereby prolongs the full therapeutic benefits of the toy 10.

Figure 2:
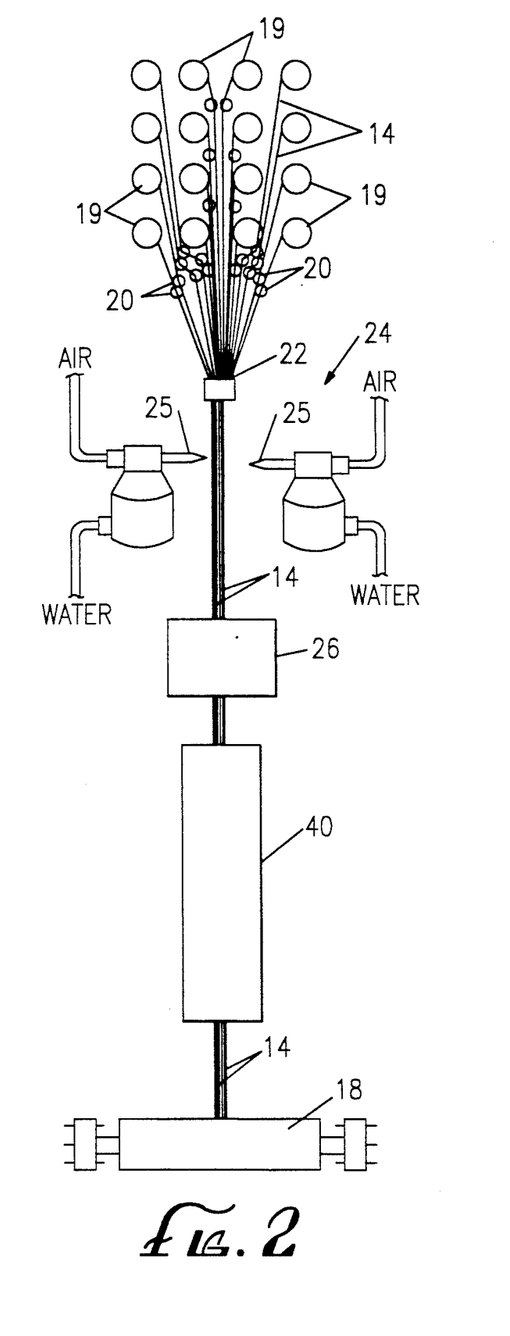
FIG. 2 is a schematic representation of a process for applying the fluoride and/or other agents onto the threads in forming the chew toy of the present invention.
Figure 3:
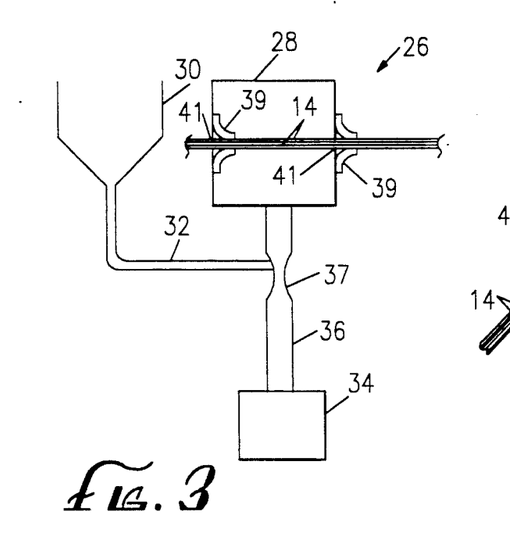
Figure 4:
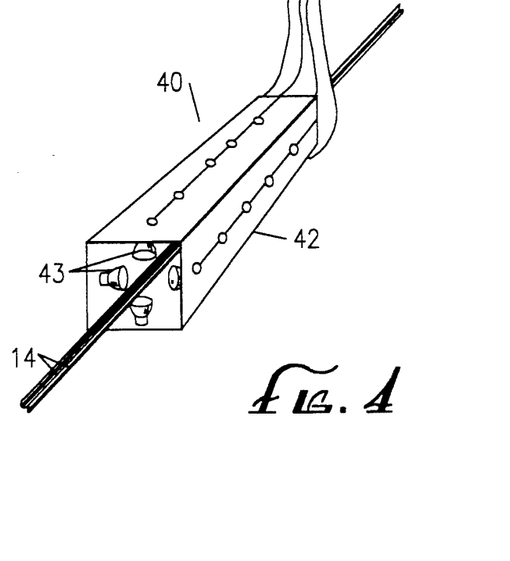

To form chew toy 10, a plurality of cotton threads 14 are individually drawn by a conventional ball warper 18 from their conventional carrying spools 19 over a plurality of following guides 20 to a collecting and spacing guide 22, as illustrated in FIG. 2. Guide 22 collects the individual threads 14 and guides the threads in a slightly spaced array to a misting station 24 where a mist of water is sprayed through one or more nozzles 25 onto the moving threads. The moisture causes the cotton fibers to expand, opening the fiber pores. The moistened threads are then directed to a fluoride spray station 26 where fluoride powder is sprayed onto the moistened threads 14. By maintaining a slight separation of the cotton threads 14 within spray station 26, the fluoride particles can be deposited onto the individual threads and thus be relatively evenly dispersed throughout the subsequently formed cotton skeins from which cotton rope 12 is formed.

Figures 1, 3, 4:
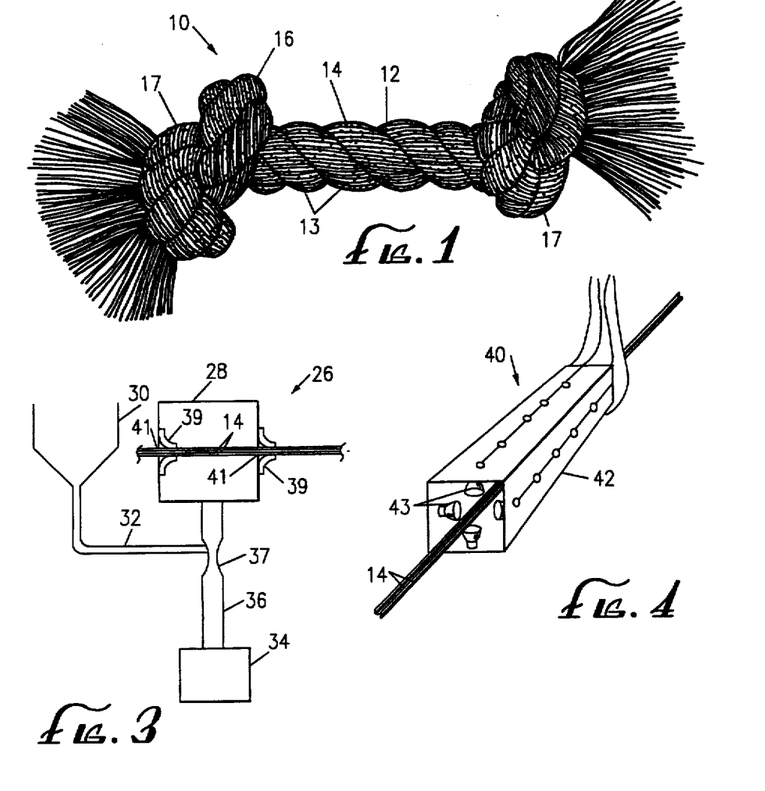
FIG. 3 is a sectional side view of the fluoride spray chamber.
FIG. 4 is a perspective view of a drying station employed in the process of forming the chew toy of the present invention.

One embodiment of a spray station 24 is illustrated in FIG. 3. As seen therein, the fluoride spray station 26 includes a chamber 28 through which the threads 14 pass. A hopper 30 is provided for holding a supply of fluoride powder, which communicates with chamber 28 by means of conduit 32. A blower 34 is disposed below chamber 28 and communicates therewith via conduit 36. Conduit 36 also communicates with conduit 32 and defines a venturi nozzle 37 therein for drawing fluoride powder from hopper 30 through conduit 32 into conduit 36, where it is carried into chamber 28 by the air flow from the blower. The venturi nozzle 38 is preferably provided with a variable orifice for adjusting the air flow there through to control the amount of fluoride drawn into conduit 36 and sprayed onto threads 14 within chamber 28. Flexible seals 39 are preferably provided about the openings 41 in the sides of chamber 28, through which the threads pass to restrict the amount of airborne fluoride passing through openings 41 into the atmosphere.

The individual threads 14 with the fluoride powder deposited thereon are then drawn by the ball warper 18 from the spray station 26 to a drying station 40 which, for example, could comprise a tunnel 42 having heat lamps 43 mounted therein, as seen in FIG. 4. The fluoride impregnated threads 14 pass through tunnel 42 and are dried by the heat from lamps 43. As the threads dry, the cotton fibers shrink as the pores therein close, securing the fluoride particles to the threads. The dried impregnated threads are then gathered by the ball warper 18 as in a conventional rope forming process, and twisted with other groups of concurrently impregnated and gathered threads so as to form three separate impregnated cotton skeins 13. The skeins are then twisted together in a conventional rope forming pattern so as to define a length of the thoroughly impregnated cotton rope 12. The rope 12 is then cut to a desired length and formed into the desired toy configuration.

As the formation of rope 12 following the impregnation of the individual cotton threads is no different from that employed in a standard rope forming process, only the initial portion of the rope forming process wherein the threads are impregnated with fluoride is illustrated in FIG. 2 and described in detail. It is also to be understood that FIG. 2 illustrates the initial portion of only one of a plurality of substantially identical forming lines used in the formation of each of skeins 13. As with conventional rope, the large number of individual threads which comprise each skein require the threads to be gathered in groups from a plurality of sets of spools by a corresponding plurality of ball warpers before being twisted together to form a skein. As each of the forming lines is virtually identical, only the initial portion of one of such lines is shown in FIG. 2.

As an alternative to the above-described process, the powdered fluoride can be adhered to the threads 14 by ionic bonding. While not specifically illustrated, this process is described with reference to FIG. 2. In such a process, the following guides 20 and collecting guide 22 are constructed of a suitable plastic or metal material such that when the individual cotton threads pass therethrough at a relatively rapid rate of about ten to twelve feet per second, an electrostatic charge is imparted to the threads. In such a process, care should be taken to avoid grounding the threads and dissipating the charge. The charged threads are then drawn directly from the collecting guide 22 to the spray station 26. A misting station is not employed. The chamber 28 in spray station 26 is ionized to impart a negative charge to the airborne powdered fluoride therein. The charged fluoride particles are blown about the interior of chamber 28 by blower 34 so that they contact the threads 14 being drawn through the chamber by the ball warper as in the prior process. The charged particles within chamber 28 are attracted to and ionically bond with the statically charged threads. The remainder of the process is identical to that previously described, except that the elimination of the misting station obviates the need for a drying station.

The fluoride which is applied to the threads 14 could be either calcium or sodium fluoride. However, since only sodium fluoride has received FDA approval for use as a dental agent, sodium fluoride is presently preferred. The preferred concentration of the fluoride powder on the cotton threads is about two percent by weight.

Figure 5:
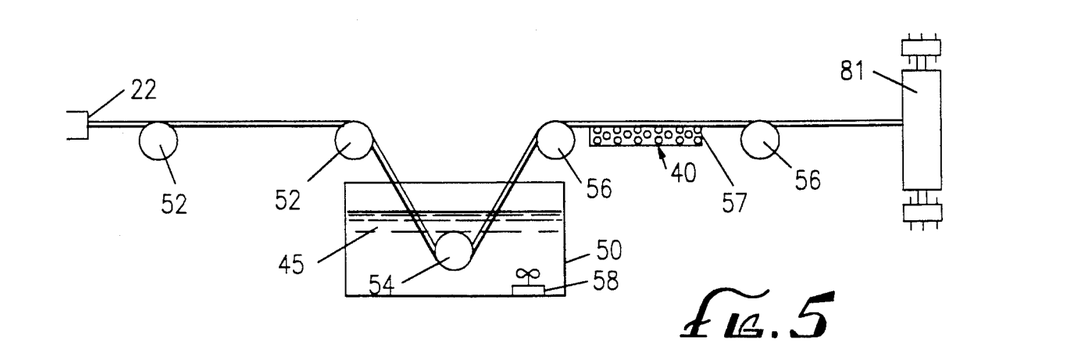
FIG. 5 is a schematic representation of an alternate process for applying the fluoride and/or other agents onto the threads in forming the chew toy of the present invention.
Figure 6:
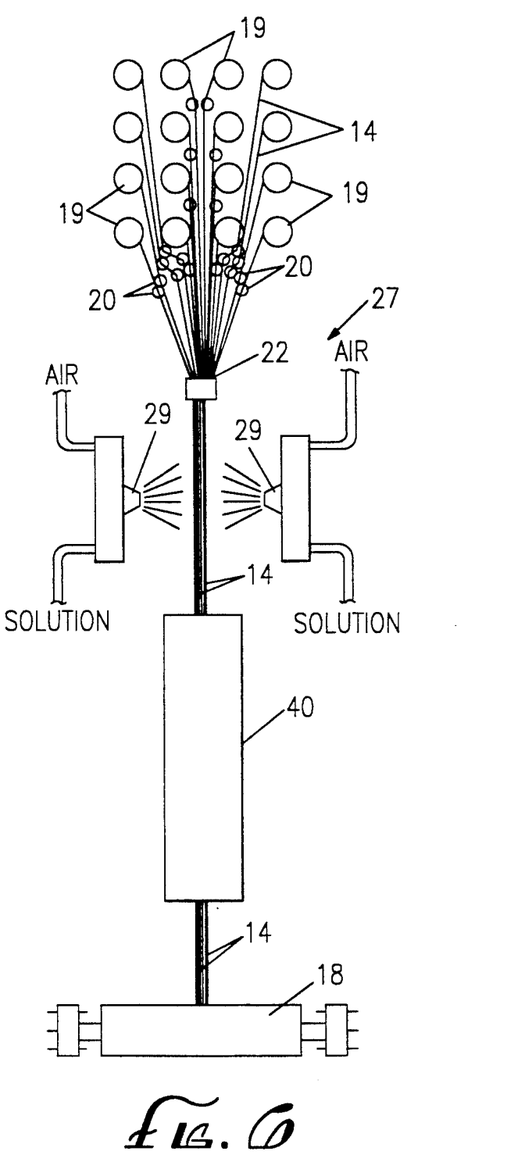
FIG. 6 is a schematic representation of another alternate process for applying the fluoride and/or other agents onto the threads in forming the chew toy of the present invention.

The fluoride can also be applied to the threads 14 in an aqueous solution. This can be achieved either by spraying the solution onto the threads as illustrated in FIG. 6, or by passing the threads through a bath of the solution as illustrated in FIG. 5. The aqueous solution preferably contains about six percent by weight fluoride and one-half percent polyvinyl alcohol. The polyvinyl alcohol renders the solution more viscous to enhance the bonding of the fluoride to the cotton rope.

When fluoride is sprayed onto the threads in an aqueous solution, the process differs from that illustrated in FIG. 1 only in the configuration of the spray station and the fact that a misting station is not employed. As seen in FIG. 6, as the threads 14 pass from the collecting guide 22 to the spray station 27, the fluoride solution is sprayed directly onto the threads through nozzles 29 mounted in the spray chamber in a sufficiently dense mist to obtain the desired saturation of the individual threads. The saturated threads then pass from the spray chamber to a drying station 40 and the process is completed as above-described.

More preferably, a fluoride bath is employed when the fluoride is applied to the threads in an aqueous solution. As seen in FIG. 5, the fluoride bath 45 is held within a container 50 and the threads 14 are directed into the bath from collector guide 22 by a series of roller guides 52. As the threads are drawn through the bath by the ball warper 18, they are directed about one or more vertically adjustable roller guides 54 mounted within container 50 and over a series of downstream roller guides 56 which direct the threads from the fluoride bath, past a drying station 40 to the ball warper 18. The drying station 40 could comprise a heated tunnel as shown in FIG. 4, an electric heater 57 as illustrated in FIG. 5, a blower or any other suitable means for drying the threads. By varying the elevation of the guides 54 within container 50, time which the threads are immersed in the bath is varied and thus, the degree of saturation of the threads 14 with the fluoride solution can be regulated independently of the rate at which the threads are moved. This allows for independent adjustments of the fluoride saturation and the drying time. An agitator 58 is also preferably provided for periodically agitating the solution to prevent the fluoride from settling to the bottom of container 50.

Another method of applying fluoride to the cotton threads employs encapsulating the fluoride in porous polymeric beads, the formation of which is disclosed in U.S. Pat. No. 4,690,825. These beads are marketed under the name MICROSPONGES by Advanced Polymer Systems, Inc. and can be applied to the cotton threads 14 utilizing the process illustrated in FIG. 1 for depositing powdered fluoride onto the threads. The encapsulated fluoride particles simply replace the fluoride powder and are deposited on the moistened threads within spray chamber 28 by means of blower 34 in the same manner described above with respect to the powdered fluoride. Alternatively, the beads can be given a strong negative ionic charge so that they will strongly adhere to statically charged cotton thread. By either method of application, the beads are distributed along and adhere to the threads such that upon the threads being formed into skeins by the ball warper and the skeins twisted into rope, the encapsulated fluoride particles are uniformly dispersed through the rope. The porous polymer beads will retain the fluoride therein and later release the fluoride under the friction exerted thereon by the dog's teeth. The use of these polymeric beads to encapsulate the fluoride will extend the useful life of the fluoride contained in rope 12 and help prevent the inadvertent mechanical separation or "falling-off" of the fluoride from the cotton rope.

In addition to fluoride, each of the aforesaid processes can be used to apply other therapeutic agents to the threads such as chlorohexadine to prevent tartar and plaque from forming on the teeth and to prevent bacteria growth. Yucca extract could also be used to inhibit bacteria growth and halitosis. Attractive flavorings such as anise could also be employed to promote frequent chewing of the chew toy 10. These agents, like fluoride, should be applied to the cotton threads prior to the threads being twisted into skeins and can be applied to the threads either with the fluoride or in lieu thereof using the same methods described above for the application of fluoride to the threads.

As noted above, the chew toy 10 could also be configured as a rope tug used by pet owners for playful tugging with their dogs. Such a configuration would provide a more limited and controlled exposure of the dog to the fluoride and/or other agents impregnated in the rope and thereby increase the useful life of the agents within the toy.

Various changes and modifications may be made in carrying out the present invention without departing from the spirit and scope thereof. Insofar as these changes and modifications are within the purview of the appended claims, they are to be considered as part of the present invention.

I claim:

1. A chew toy for dogs comprising a length of rope formed of a plurality of soft pliable threads, said threads being impregnated with a therapeutic dental agent so as to dispose said agent throughout said rope whereby upon being chewed by a dog a substantial portion of said agent is retained within said rope and a lesser portion of said agent is released onto the teeth of the dog.

2. The chew toy of claim 1 wherein said agent is at least partially retained within the pores of the fibers in said threads.

3. The chew toy of claim 1 wherein said agent is ionically bonded to said threads.

4. The chew toy of claim 1 wherein said agent is encapsulated in porous polymeric beads and said beads are ionically bonded to said threads.

5. The chew toy of claim 1 wherein said agent is encapsulated in porous polymeric beads and said beads are at least partially retained within the pores and are ionically bonded to said threads.

6. The chew toy of claim 1 wherein said therapeutic dental agent is fluoride.

7. A chew toy for dogs comprising a length of cotton rope formed of a plurality of cotton threads, said threads being individually impregnated with a therapeutic dental agent so as to dispose said agent throughout said rope whereby upon said rope being chewed by a dog; a substantial portion of said agent is retained in said rope and a lesser portion of said agent is released onto the teeth of the dog.

8. The process for forming a cotton chew toy having a therapeutic dental agent impregnated therein, said process comprising the steps of: wetting a plurality of soft pliable threads; applying particles of a therapeutic dental agent to said threads; drying said threads; forming said threads into a length of rope; and forming said length into a desired chew toy configuration.

9. The process of claim 8 wherein said particles are applied to said threads by passing said threads through an air flow containing said particles.

10. The process of claim 8 including the step of encapsulating said particles in porous polymer beads prior to applying said particles to said threads.

11. A process for forming a cotton chew toy having a therapeutic dental agent impregnated therein, said process comprising the steps of: applying an aqueous solution containing said agent to a plurality of soft pliable threads; drying said threads; forming said threads into a length of rope; and forming said length into a desired chew toy configuration.

12. The process of claim 11 wherein said applying step comprises spraying said aqueous solution onto said threads.

13. The process of claim 11 wherein said applying step comprises passing said threads through a bath of said aqueous solution.

14. The process of claim 11 wherein said agent is fluoride and said aqueous solution is comprised of about six percent by weight of said fluoride and about one-half percent by weight of polyvinyl alcohol.

15. A process for forming a cotton dog chew toy having fluoride impregnated therein, said process comprising the steps of: imparting a static charge to a plurality of cotton threads; applying fluoride particles to said threads such that said particles are ionically bonded thereto; forming said threads into a length of cotton rope; and forming said length into a desired chew toy configuration.

16. The process of claim 15 wherein said applying step comprises passing said threads through an air flow containing said fluoride particles.

17. The process of claim 15 including the step of imparting a positive electrical charge to said fluoride particles such that said particles are ionically attracted to said threads, and wherein said applying step comprises passing said threads through an air flow containing said electrically charged fluoride particles.

18. A process for forming a chew toy for improving canine dental care, said process comprising the steps of: applying one or more therapeutic dental agents to a plurality of soft pliable threads; twisting said threads to form a plurality of impregnated skeins; twisting said skeins to form a length of impregnated rope; and forming said length into a desired chew toy configuration.

19. The process of claim 18 wherein said applying step comprises wetting said threads, spraying said one or more agents onto said threads; and drying said threads.

20. The process of claim 18 wherein said applying step comprises forming an aqueous solution containing said one or more agents, applying said aqueous solution to said threads, and drying said threads.

21. The process of claim 18 including the step of encapsulating said one or more agents in porous polymeric beads prior to applying said one or more agents to said threads.

22. The process of claim 18 wherein said one or more therapeutic dental agents comprise chlorohexadine.

23. A process for forming a chew toy for improving canine dental care, said process comprising the steps of: imparting a static charge to a plurality of cotton threads; imparting an electric charge to one or more therapeutic dental agents such that said one or more agents are attracted to said threads; applying said one or more agents to said threads whereupon said one or more agents are ionically bonded to said threads; twisting said threads to form a plurality of cotton skeins; twisting said skeins to form a length of cotton rope; and forming said length into a desired chew toy configuration.

24. A process for forming a chew toy for dogs having a breath freshener therein, said process comprising the steps of: applying a breath freshening agent to a plurality of absorbent threads; twisting said threads to form a plurality of skeins impregnated with said agent; twisting said skeins to form a length of impregnated rope; and forming said length into a desired chew toy configuration.

25. A process for forming a chew toy impregnated with a breath freshening agent and comprised of absorbent threads, said process comprising the steps of: wetting a plurality of soft absorbent threads; spraying a breath freshening agent onto said threads; drying said threads; forming said threads into a length of rope; and forming said length into a desired chew toy configuration.

26. A process for forming a chew toy impregnated with a breath freshening agent and comprised of absorbent threads, said process comprising the steps of: applying an aqueous solution containing a breath freshening agent to a plurality of soft absorbent threads; forming said threads into a length of rope; and forming said length into a desired chew toy configuration.

27. A process for forming a chew toy impregnated with a breath freshening agent and comprised of absorbent threads, said process comprising the steps of: imparting a static charge to a plurality of soft absorbent threads; imparting an electrical charge to a plurality of particles containing a breath freshening agent such that said particles are attracted to said thread; applying said particles to said threads whereupon said particles are ionically bonded to said threads; forming said threads to a length of rope; and forming said length into a desired chew toy configuration.

28. A process for forming a chew toy impregnated with a breath freshening agent and comprised of absorbent threads, said process comprising the steps of: wetting a plurality of soft absorbent threads; encapsulating a breath freshening agent in porous polymeric beads; spraying said beads onto said threads; drying said threads; forming said threads into a length of rope; and forming said length into a desired chew toy configuration.

29. A process for forming a chew toy impregnated with a breath freshening agent and comprised of absorbent threads, said process comprising the steps of: wetting a plurality of soft absorbent threads; encapsulating a breath freshening agent in porous polymeric beads; spraying said beads onto said threads; forming said threads into a length of rope; and forming said length into a desired chew toy configuration.

30. A process for forming a chew toy impregnated with a breath freshening agent and comprised of absorbent threads, said process comprising the steps of: wetting a plurality of soft absorbent threads; spraying a breath freshening agent onto said threads; forming said threads into a length of rope; and forming said length into a desired chew toy configuration.

31. A process for forming a chew toy for improving canine dental care, said process comprising the steps of wetting a plurality of soft absorbent threads; spraying a therapeutic dental agent onto said threads; forming said threads into a length of rope; and forming said length into a desired chew toy configuration.

32. The process of claim 31 including the step of drying said threads prior to forming said threads into a length of rope.

33. The process of claim 31 including the step of encapsulating said agent in porous polymeric beads prior to said spraying step.

34. The process of claim 33 including the step of drying said threads prior to forming said threads into said length of rope.

35. A process for forming a flavored therapeutic chew toy for dogs comprising the steps of wetting a plurality of soft pliable threads; spraying a flavoring agent onto said threads; forming said threads into a length of rope; and forming said length into a desired chew toy configuration.

36. The process of claim 35 including the step of drying said threads prior to forming said threads into a length of rope.

37. The process of claim 35 including the step of encapsulating said flavoring agent in porous polymeric beads prior to spraying said agent onto said threads.

38. The process of claim 37 including the step of drying said threads prior to forming said threads into said length of rope.

39. A chew toy for dogs comprising a length of rope formed of a plurality of soft pliable threads, said threads being individually impregnated with a therapeutic dental agent so as to dispose said agent throughout said rope whereby upon said rope being chewed by a dog, a substantial portion of said agent is retained in said rope and a lesser portion of said agent is released onto the teeth of the dog.

40. A chew toy for dogs comprising a length of rope formed of a plurality of soft pliable threads, a therapeutic dental agent, said agent being ionically bonded to said threads throughout said rope whereby upon said rope being chewed by a dog, a substantial portion of said agent is retained within said rope and a lesser portion of said agent is released onto the teeth of the dog.

41. A process for forming a chew toy for improving canine dental care, said process comprising the steps of: imparting a static charge to a plurality of soft pliable threads; applying particles of a therapeutic dental agent to said threads such that said particles are ionically bonded thereto; forming said threads into a length of rope; and forming said length into a desired chew toy configuration.

42. The process of claim 41 wherein said applying step comprises passing said threads through an air flow containing said particles.

43. The process of claim 41 including the step of imparting a positive electrical charge to said particles such that said particles are ionically attracted to said threads, and wherein said applying step comprises passing said threads through an air flow containing said electrically charged particles.

44. A process for forming a therapeutic chew toy for dogs having a breath freshening agent impregnated therein, said process comprising the steps of: imparting a static charge to a plurality of soft pliable threads; applying particles of a breath freshening agent to said threads such that said threads are ionically bonded thereto; forming said threads into a length of rope; and forming said length into a desired chew toy configuration.

* * * * *

UNITED STATES PATENT AND TRADEMARK OFFICE
CERTIFICATE OF CORRECTION

PATENT NO. : 5,329,881
DATED : July 19, 1994
INVENTOR(S) : Anthony O'Rourke

It is certified that error appears in the above-indentified patent and that said Letters Patent is hereby corrected as shown below:

```
The title page, showing an illustrative figure, should be deleted
and substitute therefor the attached title page.

Delete Drawing Sheet 1, and substitute therefor the Drawing Sheet
consisting of FIGS. 1, 3, 4, and 5, as shown on the attached page.
```

Signed and Sealed this

Seventh Day of February, 1995

Attest:

BRUCE LEHMAN

Attesting Officer    Commissioner of Patents and Trademarks

United States Patent
O'Rourke

Patent Number: 5,329,881
Date of Patent: Jul. 19, 1994

[54] DOG CHEW TOY FOR CANINE DENTAL CARE AND METHODS FOR MAKING CHEW TOY

[75] Inventor: Anthony O'Rourke, Malibu, Calif.

[73] Assignee: Booda Products, Inc., Gardena, Calif.

[21] Appl. No.: 938,282

[22] Filed: Aug. 31, 1992

[51] Int. Cl.5 ............................................. A01K 29/00
[52] U.S. Cl. ...................................... 119/710; 427/2; 427/2.29; 119/709
[58] Field of Search ................. 119/29, 29.5; 132/321; 433/1; 128/62 A; 424/52, 58, 442; 427/2

[56] References Cited

U.S. PATENT DOCUMENTS

| | | | |
|---|---|---|---|
| 1,149,170 | 8/1915 | Allis | 119/29.5 |
| 4,033,365 | 7/1977 | Klepak et al. | 132/321 |
| 4,034,771 | 7/1977 | Guyton | 132/321 |
| 4,414,990 | 11/1983 | Yost | 132/321 |
| 4,924,811 | 5/1990 | Axelrod | 433/1 X |
| 4,986,288 | 1/1991 | Kent et al. | 132/321 |
| 5,033,410 | 7/1991 | Siqurdsson | 119/29.5 |
| 5,092,272 | 3/1992 | O'Rourke | 119/29 |

*Primary Examiner*—Robert P. Swiatek
*Attorney, Agent, or Firm*—Lyon & Lyon

[57] ABSTRACT

A chew toy for dogs comprising a length of cotton rope formed of a plurality of cotton threads impregnated with fluoride particles so as to dispose the fluoride particles throughout the toy such that the cotton rope provides a gentle cleaning and flossing of the dog's teeth and massaging of the dog's gums when chewed and contains the fluoride for gradual release as the fluoride combines with the saliva on the teeth of the dog as the dog chews and/or tugs on the toy to prevent tooth decay. The fluoride particles are applied to the individual cotton fibers prior to forming the fibers into the length of rope to provide the desired fluoride distribution throughout the toy.

44 Claims, 2 Drawing Sheets fig. 1 fig.1 fig.3 fig.4 fig.5